US009823265B2

(12) United States Patent
Valsvik et al.

(10) Patent No.: US 9,823,265 B2
(45) Date of Patent: Nov. 21, 2017

(54) GEOPHYSICAL ACCELERATION SENSOR AND METHOD

(71) Applicant: Seabed Geosolutions AS, Laksevag (NO)

(72) Inventors: Geir Valsvik, Laksevag (NO); Arne Rokkan, Olsvik (NO); Eldar Agdestein, Raadal (NO); Bjarne Isfeldt, Mathopen (NO)

(73) Assignee: Seabed Geosolutions AS, Laksevag (NO)

( * ) Notice: Subject to any disclaimer, the term of this patent is extended or adjusted under 35 U.S.C. 154(b) by 56 days.

(21) Appl. No.: 14/652,610

(22) PCT Filed: Dec. 18, 2013

(86) PCT No.: PCT/EP2013/077252
§ 371 (c)(1),
(2) Date: Jun. 16, 2015

(87) PCT Pub. No.: WO2014/096109
PCT Pub. Date: Jun. 26, 2014

(65) Prior Publication Data
US 2015/0338433 A1    Nov. 26, 2015

(30) Foreign Application Priority Data
Dec. 21, 2012   (NO) .................................. 20121549

(51) Int. Cl.
*G01P 15/09*    (2006.01)
*G01P 15/08*    (2006.01)
*G01V 1/18*    (2006.01)

(52) U.S. Cl.
CPC .......... *G01P 15/09* (2013.01); *G01P 15/0802* (2013.01); *G01P 15/0922* (2013.01); *G01V 1/181* (2013.01); *G01P 2015/0871* (2013.01)

(58) Field of Classification Search
CPC ..................... G01P 15/0922; G01P 2015/0871
(Continued)

(56) References Cited

U.S. PATENT DOCUMENTS 3,002,391 A    10/1961 Holmes
4,333,029 A *  6/1982 Kolm ..................... G01V 1/181
                                              310/329

(Continued)

FOREIGN PATENT DOCUMENTS

GB        2176607        1/1988

OTHER PUBLICATIONS

Norwegian Office Action in related Norwegian Patent Application No. 20121549, dated May 30, 2013.
(Continued)

*Primary Examiner* — John Chapman, Jr.
(74) *Attorney, Agent, or Firm* — Park, Vaughan, Fleming & Dowler LLP; Shane Nelson

(57) ABSTRACT

A method and geophysical acceleration sensor (100) for measuring seismic data and also for protecting the sensor from shock. The sensor includes a housing (102); a flexible beam (104) having a first end fixedly attached to the housing; a piezoelectric layer (108) attached to the flexible beam; a seismic mass (112) attached to the flexible beam; and a first movement limiter (130) connected to the housing and configured to limit a movement of the flexible beam. A distance between a tip of the first movement limiter and the flexible beam is adjustable.

23 Claims, 10 Drawing Sheets

(58) Field of Classification Search
USPC .................................................... 73/514.34
See application file for complete search history.

(56) References Cited

U.S. PATENT DOCUMENTS

| | | | |
|---|---|---|---|
| 4,750,363 A * | 6/1988 | Norling | G01P 15/097 |
| | | | 73/497 |
| 4,928,263 A | 5/1990 | Armstrong et al. | |
| 6,098,460 A * | 8/2000 | Otsuchi | G01L 5/0052 |
| | | | 310/331 |
| 6,594,199 B2 | 7/2003 | Birchak et al. | |
| 9,054,294 B2 * | 6/2015 | Haskett | H01L 41/053 |
| 2002/0136090 A1 | 9/2002 | Birchak et al. | |
| 2008/0092651 A1 | 4/2008 | Menard et al. | |
| 2012/0227274 A1 | 9/2012 | Watanabe et al. | |

OTHER PUBLICATIONS

International Search Report in International Application No. PCT/EP2013/077252, dated Oct. 9, 2014.
Written Opinion fo the International Searching Authority in International Application No. PCT/EP2013/077252, dated Oct. 9, 2014.
Wilcoxon Research Inc., Model 731A Ultra-quiet, ultra low frequency, seismic accelerometer [product specification sheet], 98078, Rev.C.4 8/09.
Wilcoxon Research Inc., Model 731A Ultra-quiet, ultra low frequency, seismic accelerometer [product specification sheet], 98078, Rev.C.6 3/10.
Meggitt Sensing Systems, Wilcoxon Research model 731-207 Ultra low frequency seismic accelerometer [product specification sheet], 98069, Rev.C.4 5/12.

* cited by examiner

GEOPHYSICAL ACCELERATION SENSOR AND METHOD

BACKGROUND

Technical Field

Embodiments of the subject matter disclosed herein generally relate to sensors for collecting seismic data and, more particularly, to mechanisms and techniques for providing such sensors to withstand shocks and other adverse conditions when deployed in the field.

Discussion of the Background

Seismic data acquisition and processing may be used to generate a profile (image) of the geophysical structure under the ground (either on land or seabed). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

Traditionally, a seabed seismic survey is performed in the following way: Plural seismic sensors are electrically connected to each other and then stored on a vessel. The vessel travels to the area needing to be surveyed and deploys the seismic sensors to the seabed. However, during the deployment phase, the seismic sensors may be subjected to impacts (e.g., with the vessel, the crane handling the sensors, the water, the seabed, etc.). Because the seismic sensors are designed to detect small variations of a given parameter (e.g., displacement, speed, acceleration, pressure, etc.), the sensors' internal components are very sensitive to jarring or direct contact, and may be damaged by an unintentional shock.

After all the seismic sensors have been deployed, one or more seismic sources are brought and actuated to generate seismic waves, which propagate through the water and then through the seabed until they are reflected by various reflectors in the subsurface. The reflected waves propagate to the seismic sensors, where earth movement is recorded. However, if the seismic sensor is damaged because of a shock received during deployment, the recorded data is poor.

Two conventional seismic sensors, the geophone and the micro-electro-mechanical system (MEMS) accelerometer, and their limitations are now discussed. Geophone technology is based on electromagnetic induction. The geophone includes a magnet encapsulated by a moving electric coil. Movement of the electric coil in the magnetic field produced by the magnet induces a voltage in the coil. This voltage is a function of the velocity of the coil and, thus, the geophone's velocity. A disadvantage of the geophone is poor response at low frequencies and the presence of resonance inside the seismic band. Another disadvantage is that the magnet inside the geophone creates problems for other magnetic devices, such as electro-mechanical (EM) equipment and magnetic compasses embedded in other sensors to provide directional information.

The MEMS accelerometer has a microscopic finger that is sensitive to any shock or movement. Its relative capacitance to a reference is proportional to its movement. In other words, when the finger is subjected to acceleration, the capacitance between the reference and the finger will change due to a deformation of the finger. The change in capacitance is measured, and a signal is fed back to the finger via an electric field that forces the capacitive finger to equilibrium. The change in capacitance is modulated in a digital circuit and, thus, provides a signal output proportional to the acceleration. However, the conventional MEMS accelerometer has a relatively high noise level at low frequencies.

Other accelerometers have a piezoelectric component, and an amplifier converts the electric charge accumulated on the piezoelectric component to voltage. These piezoelectric accelerometers rely on the piezoelectric effect of quartz or ceramic crystals to generate an electrical output proportional to the applied acceleration. The piezoelectric effect produces an opposed accumulation of charged particles on the crystal. This charge is proportional to the applied force or stress. A force applied to a quartz crystal lattice structure alters the alignment of positive and negative charges, which results in an accumulation of these charges on opposed surfaces. These charges accumulate on an electrode that is connected to an for analysis.

A variety of mechanical configurations are available to perform the transduction principles of a piezoelectric accelerometer, and are defined by the way in which the inertial force of an accelerated mass acts upon the piezoelectric material.

For example, shear mode designs bond or "sandwich" the sensing crystals between a center post and a seismic mass. Under acceleration, the seismic mass causes a shear stress to be applied to the sensing crystal. Shear accelerometers are good in rejecting thermal transient and base bending effects. Also, shear geometry lends itself to small size, which minimizes mass loading effects on the test structure.

Another example of a piezoelectric accelerometer is a flexural mode design that utilizes beam-shaped sensing crystals, which are supported to create strain on the crystal when accelerated. The crystal may be bonded to a carrier beam that increases the amount of strain when accelerated. This design offers a low profile, light weight, good thermal stability, and a low price. Insensitivity to transverse motion is an inherent feature of this design. Generally, flexural beam designs are well-suited for low-frequency, low-gravity (low-g) level applications such as those which may be encountered during structural testing.

Compression mode accelerometers offer a simple structure, high rigidity, and high availability. Upright compression design offers high resonant frequencies, resulting in a broad, accurate frequency response range. This design is generally rugged and can withstand high-g shock levels. However, upright compression designs tend to be more sensitive to base bending (strain) and thermal transient effects. Inverted compression designs isolate the sensing crystals from the mounting base, reducing base bending effects and minimizing the effects of a thermally unstable test structure. Isolated compression designs reduce erroneous outputs due to base strain and thermal transients. These benefits are achieved by mechanically isolating the sensing crystals from the mounting base and utilizing a hollowed-out seismic mass that acts as a thermal insulation barrier. These mechanical enhancements allow stable performance at low frequencies, where thermal transient effects can create a signal "drift" with other compression designs.

Some of the materials used for piezoelectric accelerometers are now discussed. Quartz is a natural material commonly used in accelerometers and exhibits unmatched long-term stability. Lead zirconate titinate (PZT) is another common material used in accelerometers after they have been "polarized." High shock levels or high-temperature installations may cause shifts in the output of PZT-based sensors. However, quartz exhibits superior temperature stability and has no aging effects and is, therefore, extremely stable over time. Quartz sensors offer high-voltage sensitivities and require voltage amplifiers to condition the signal.

Voltage amplifiers, with large-valued resistors, are inherently noisier and limit the minimum measurable signal, but allow for very high levels of vibration to be monitored. PZT-based sensors provide a high charge output and a high capacitance. "Quieter" microelectronic charge amplifiers may be used, thus allowing the low-level vibrations to be measured.

When selecting accelerometers, the vibration specialist needs to consider three areas: amplitude range, frequency range, and environmental considerations. The amplitude range can be increased by either increasing the supply voltage level or decreasing the sensitivity of the accelerometer. The resolution (frequency range) of the sensor is determined by two factors: electrical noise of the internal amplifier and mechanical gain of the mass/piezoelectric system. The larger the seismic mass, the larger the output of the sensor prior to amplification. This high mechanical gain improves low-level measurements by producing substantial electrical signals without the use of amplifier gain. The frequency response of an accelerometer is described as the frequency range over which the sensor will provide a linear response. The upper end of the frequency response is governed by the mechanical stiffness and size of the seismic mass in the sensing element, while the low-frequency range is controlled by the amplifier roll-off and discharge time constant. A large seismic mass will also produce higher mechanical gain, thereby resulting in a lower noise accelerometer with greater sensitivity. A smaller seismic mass will produce lower signals but will result in a sensor with a higher resonant frequency.

However, a common problem of the above-noted accelerometers is that above a certain critical strain (the "elastic limit"), a material will plastically deform, with the consequences that the load cell will have to be recalibrated, or be damaged and eventually break, or suffer reduced life. The transient forces that occur when a sensor collides with the environment are hard to control and may exceed the design force limit for the sensing beam. To prevent damage from these types of events, overload protection is sometimes designed into force/torque sensors. An overload protection device must provide safe deflection of the load cell in all active directions without disturbance forces, but must provide greatly increased stiffness and strength for deflections above the safe operating point.

Thus, there is generally a need for a solution providing high tolerance to high-g forces, low noise measurements and adequate low-frequency response. More specifically, there is a need for a solution suitable for field use in seismic applications because in the marine environment, sensors are often exposed to high-g shocks.

SUMMARY OF THE INVENTION

According to an exemplary embodiment, there is a geophysical acceleration sensor for determining an acceleration of a medium during a seismic survey. The geophysical acceleration sensor includes a housing; a flexible beam having a first end fixedly attached to the housing; a piezoelectric layer attached to the flexible beam; a seismic mass attached to the flexible beam; and a first movement limiter connected to the housing and configured to limit a movement of the flexible beam. A distance between a tip of the first movement limiter and the flexible beam is adjustable.

According to another exemplary embodiment, there is a geophysical accelerator sensor for determining an acceleration of a medium during a seismic survey. The geophysical accelerator sensor includes a housing having two openings; a base that attaches to one opening of the housing; a flexible beam having a first end fixedly attached to the base; a piezoelectric layer attached to the flexible beam; and a seismic mass attached to a second end of the flexible beam. The seismic mass limits a movement of the second end of the flexible beam.

According to still another exemplary embodiment, there is a method for detecting an acceleration of a medium generated by seismic waves. The method includes deploying a geophysical acceleration sensor over a survey area; in response to the seismic waves, oscillating a flexible beam having a first end fixedly attached to a housing; inducing a stress with an inertial mass into a piezoelectric layer attached to the flexible beam, the inertial mass being attached to the flexible beam; generating a voltage in the piezoelectric layer, as a result of the induced stress; and limiting a motion of the flexible beam with a movement limiter connected to the housing.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. Also, in similar drawings, a same element may be identified by related reference numbers, e.g., 104, 204 and 304 indicate the same element in FIGS. 1, 2, and 3, respectively. Thus, a description of elements 204 and 304 is omitted as being identical to the description of element 104. The following detailed description does not limit the invention. Instead, the scope of the invention is defined by the appended claims. The following embodiments are discussed, for simplicity, with regard to the terminology and structure of a MEMS acceleration sensor. However, the embodiments to be discussed next are not limited to MEMS acceleration sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a geophysical acceleration sensor (GAS) that has improved detection properties and, at the same time, higher resistance to unwanted and potentially damaging shocks. The GAS has a flexible beam with one or two ends fixed to a housing and one or more piezoelectric layers provided on the flexible beam. An inertial mass attached to the flexible beam and/or the piezoelectric layers induces a stress into the piezoelectric layers, which in turn generate a voltage proportional to an acceleration of the medium. Movement of the inertial mass and/or the flexible beam and/or the piezoelectric layer is limited along a given axis by providing movement limiters, e.g., screws. In another embodiment, a movement limiter is attached at a free end of the flexible beam and is part of the inertial mass. These various embodiments are now discussed in more detail.

Figure 1B:
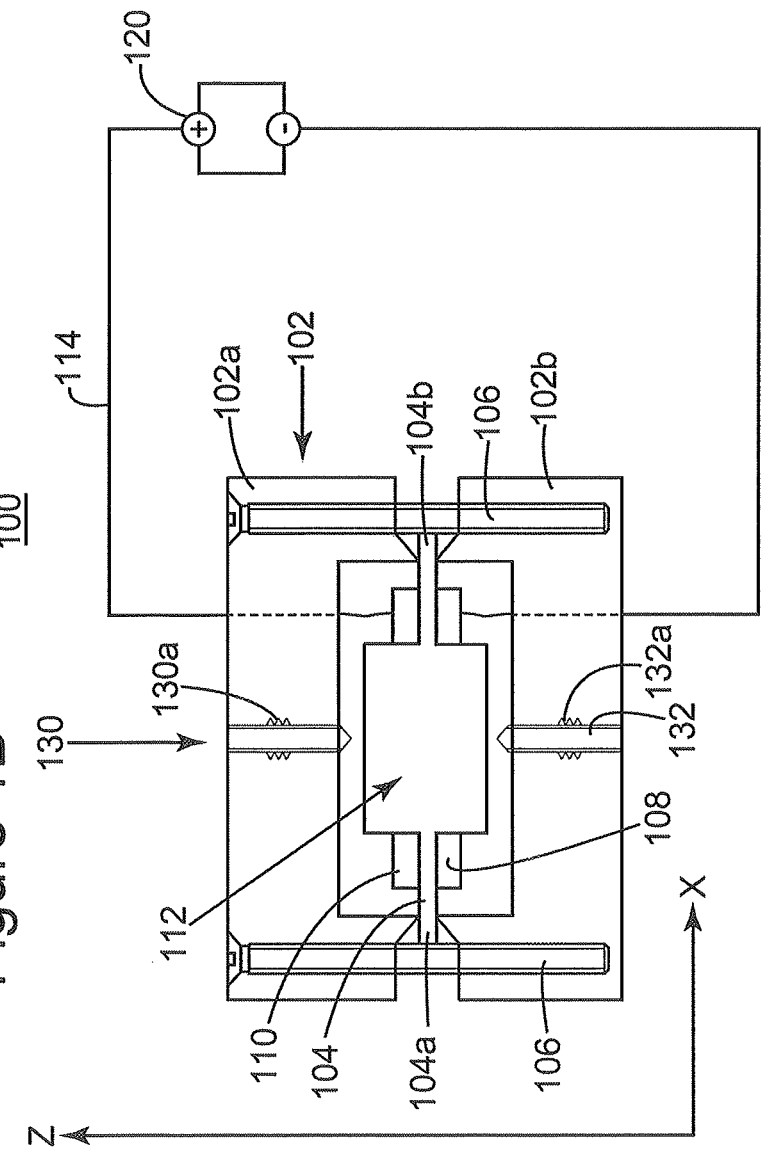
FIGS. 1A and 1B are schematic diagrams of a geophysical acceleration sensor used in seismic surveys according to an exemplary embodiment.
Figure 1A:
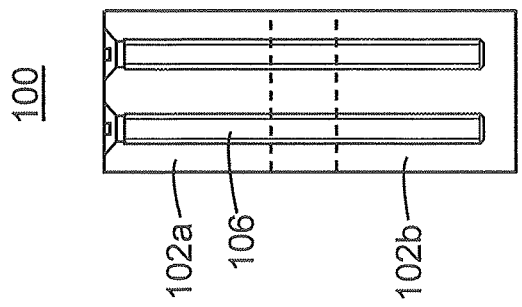
Figure 2:
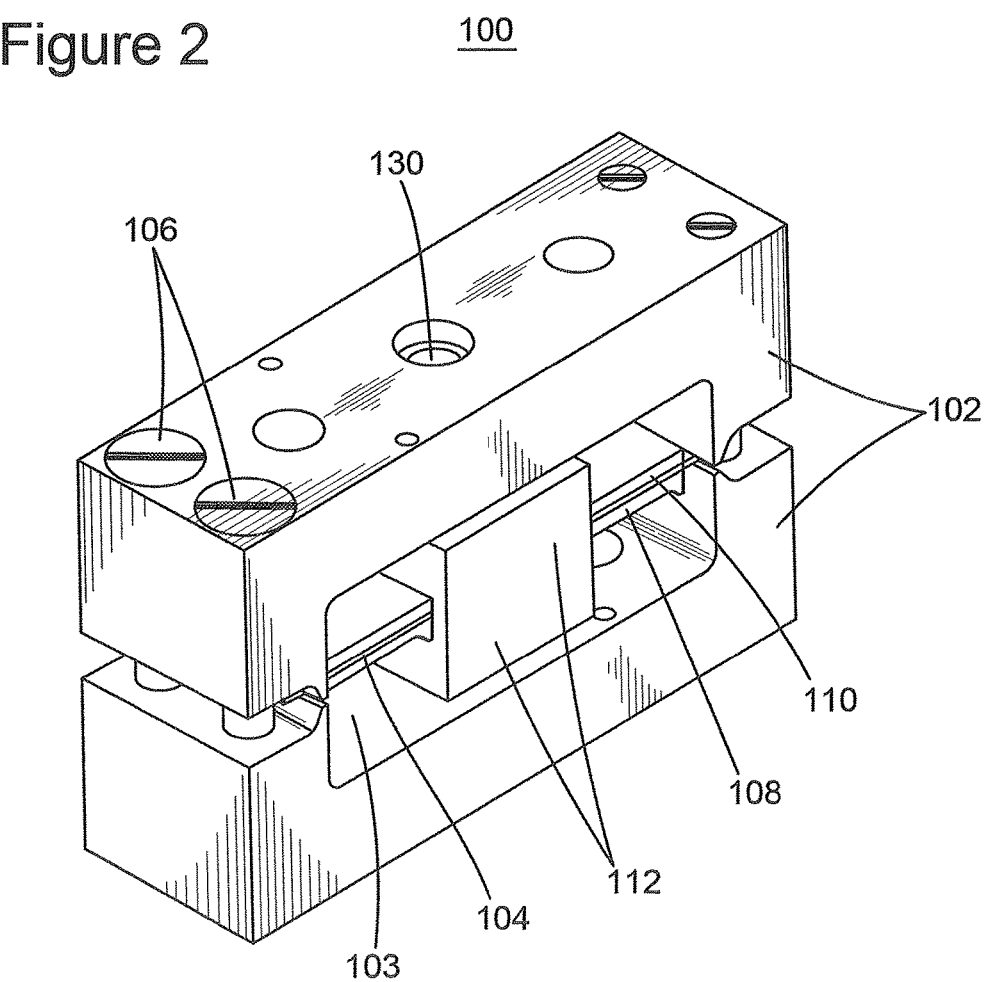
FIG. 2 is a perspective view of a geophysical acceleration sensor having two movement limiters according to an exemplary embodiment.

According to an exemplary embodiment illustrated in FIG. 1A, a geophysical acceleration sensor 100 includes a housing 102 configured to house a piezoelectric material. A flexible beam 104 is fixed between two housing parts 102a and 102b of the housing 102. The two housing parts 102a and 102b are fixedly attached to each other by various fastening means, e.g., bolts 106. In this embodiment, both ends 104a and 104b of the flexible beam 104 are fixedly sandwiched between the housing parts 102a and 102b. In other words, no end of the flexible beam 104 is free to move. FIG. 1B shows a side view of the GAS 100, and FIG. 2 shows a perspective view of the GAS 100, in which the inside volume 103 of the housing 102 freely communicates with the ambient.

Piezoelectric material may be deposited on the flexible beam 104 at one or more locations. For example, FIG. 1A shows two layers 108 and 110 of piezoelectric material deposited on both sides of the flexible beam 104. However, those skilled in the art would recognize that the GAS 100 could work with only one layer 108 or even with less piezoelectric material than the layer 108. Also, the GAS 100 may have the piezoelectric material at other locations on the flexible beam 104 or under other forms than a layer, e.g., isolated points electrically connected to each other.

To provide strain on one of the layers 108 and/or 110, an inertial mass 112 may be attached to the flexible beam 104, or to the layers 108 and 110, or to both the flexible beam and the piezoelectric layers. The mass of the inertial mass 112 may differ from sensor to sensor, depending on the aim of the seismic survey. Because the mass is associated with the amount of strain applied to the piezoelectric layers and with the sensibility of the flexible beam, by adjusting the mass, the sensitivity of the GAS is adjusted. The inertial mass may be glued, attached with a clamp or screwed, or attached by other means to the flexible beam and/or the piezoelectric layers. The same is true for attaching the piezoelectric layers to the flexible beam. The flexible beam may be made of metal or other flexible materials. In one application, the flexible beam is non-metallic. The inertial mass may be made of any material. In one application, the flexible beam may be made of a piezoelectric material, in which case, there is no need to deposit a piezoelectric layer.

Figure 3:
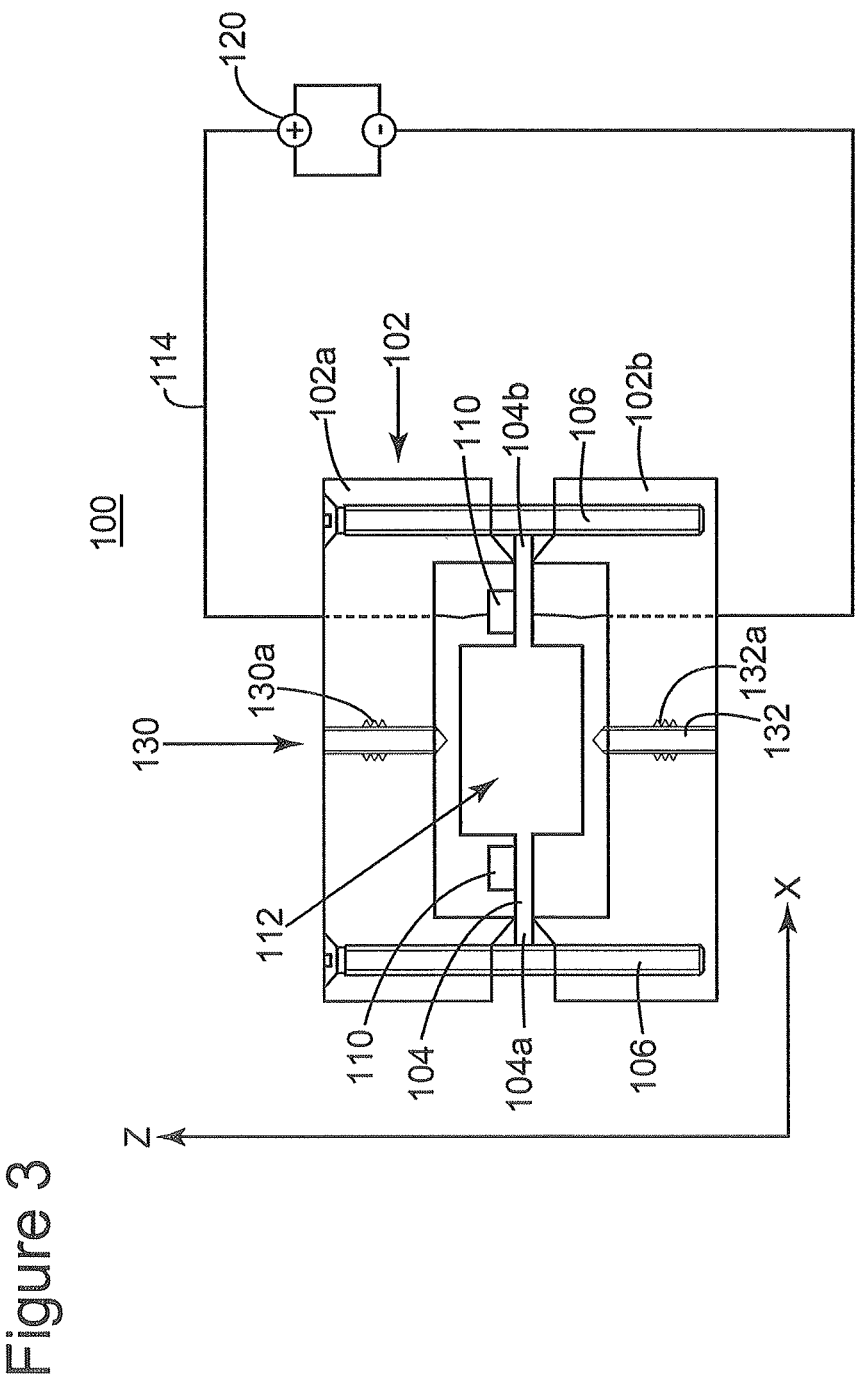
FIG. 3 is a cross-section view of another geophysical acceleration sensor according to an exemplary embodiment.

Although FIG. 1A shows the piezoelectric layers 108 and 110 in contact with the inertial mass 112, note that they may be separated by any distance, as shown in FIG. 3. The inertial mass 112 may be made of multiple pieces such as, for example, two parts connected together over the flexible beam and/or the piezoelectric layers.

The electric charges that accumulate on the piezoelectric layers need to be directed to dedicated electronics for estimating the acceleration applied to the sensor. For this reason, wires 114 are connected between the piezoelectric layers 108 and 110 and a control device 120. The wires enter through the housing parts 102a and 102b to connect to the piezoelectric layers. If the flexible beam 104 is made of metal, then one electric wire may be connected to the top piezoelectric layer 110 and the other electric wire may be connected to the bottom piezoelectric layer 108.

However, in another embodiment illustrated in FIG. 3, only a piezoelectric layer 110 is provided on the flexible beam 104 and one of the wires 114 is directly connected to the flexible beam. In still another exemplary embodiment, the wire may be connected to the flexible beam at the end 104b. If the flexible beam is non-metallic, both wires 114 need to be connected to the piezoelectric layer 110.

Returning to FIG. 1A, a top movement limiter 130 may be provided to limit the movement of the inertial mass 112 along a positive direction of the Z axis, and a bottom movement limiter 132 may be provided to limit the inertial mass's movement along a negative direction of the Z axis. The top and bottom movement limiters may have screw threads 130a and 132a so that the position of the movement limiters' tips may be adjusted relative to the inertial mass as desired. In one application, the movement limiter may be rotated from outside the housing 102 to adjust the distance between its tip and the flexible beam and/or the inertial mass.

In this way, the inertial mass's freedom of movement is limited (e.g., controlled) along the Z axis, which reduces the effect of any high-g force accidentally applied to the seismic sensor. In other words, the novel movement limiters compensate for the flexible beam's stiffness. Thus, the advantages of the flexural piezoelectric accelerometer are combined with improved shock resistance.

Figure 4:
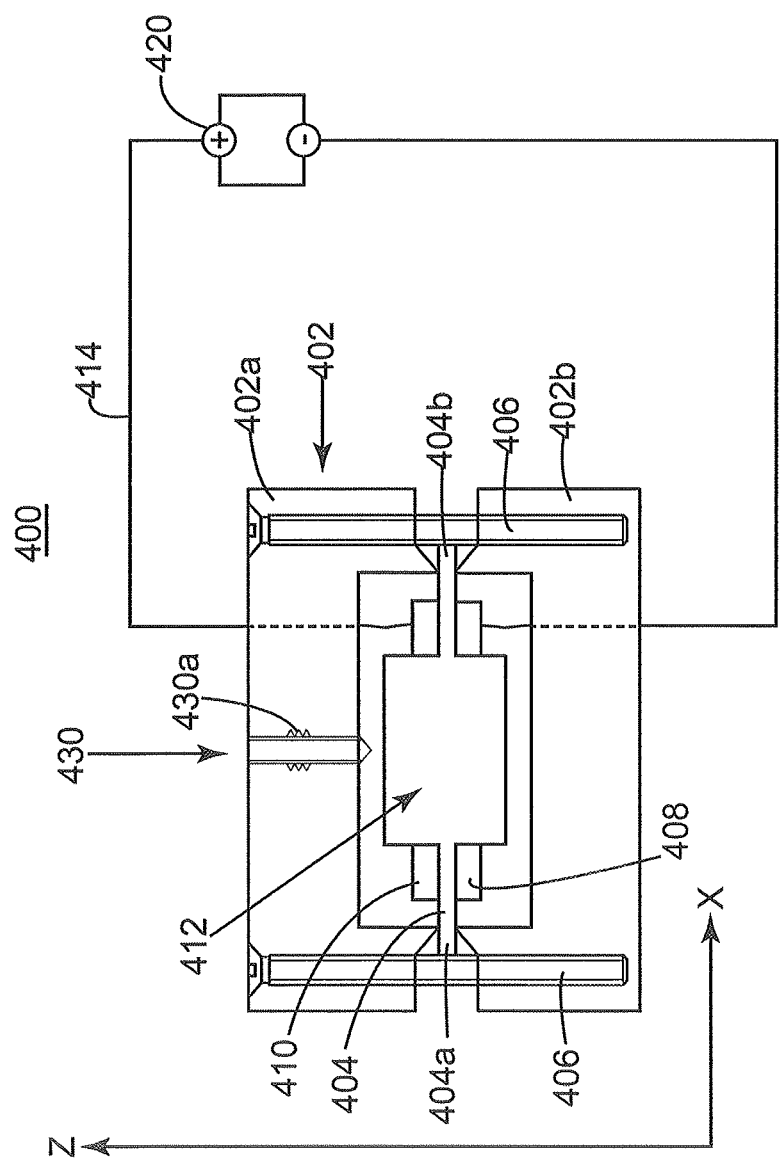
FIG. 4 is a cross-section view of still another geophysical acceleration sensor having a single movement limiter according to an exemplary embodiment.

In another exemplary embodiment illustrated in FIG. 4, a single movement limiter 430 is used. The positions of the movement limiter may be changed; for example, it may be offset from the inertial mass, along a longitudinal direction X of the flexible beam, to limit the movement of the flexible beam and/or the piezoelectric layers.

Figure 5:
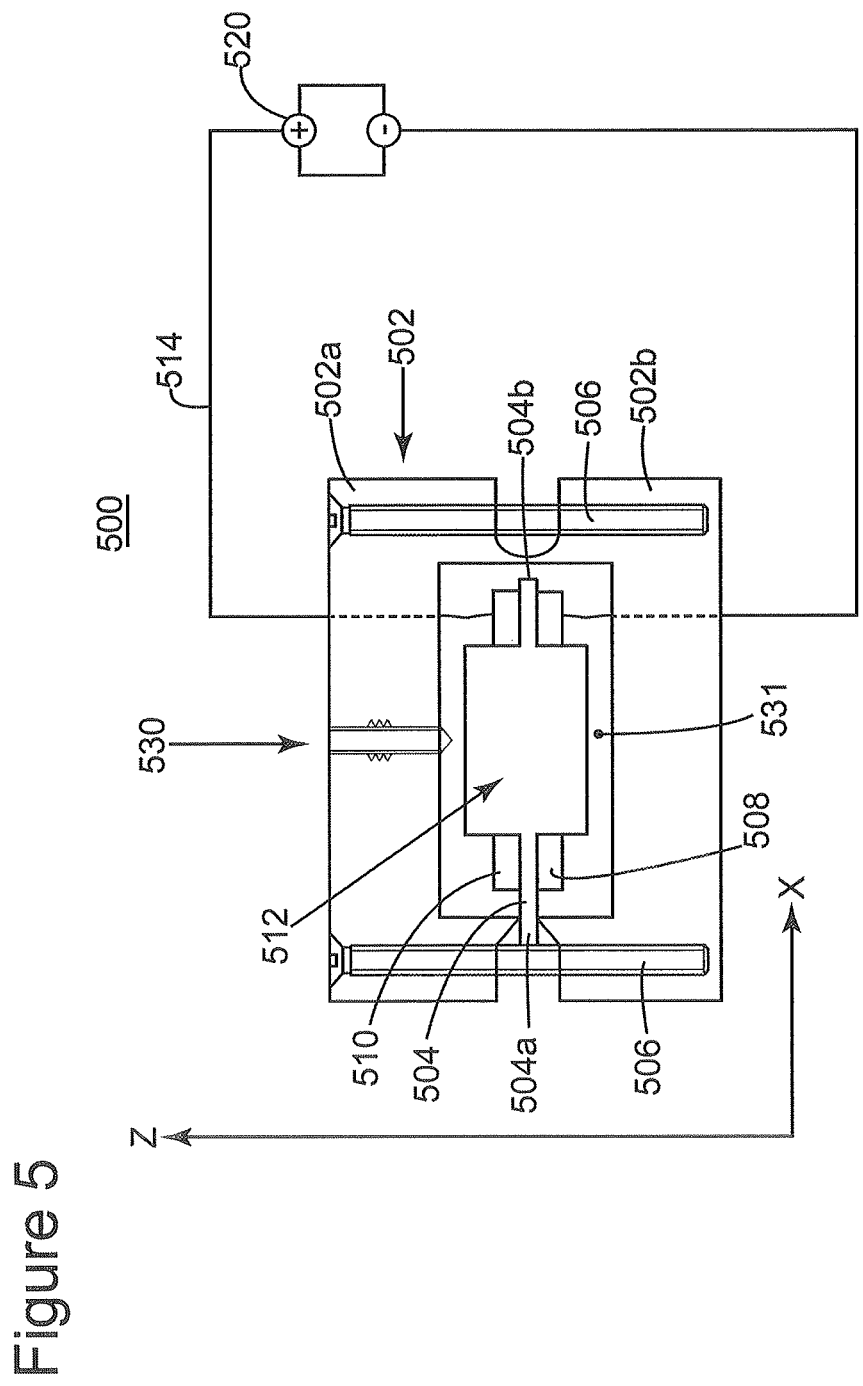
FIG. 5 is a cross-section view of yet another geophysical acceleration sensor having a free end flexible beam according to an exemplary embodiment.

In still another exemplary embodiment illustrated in FIG. 5, the flexible beam 504 has one end, e.g., end 504b free to oscillate, and only the other end 504a is fixed between the housing parts 502a and 502b of the housing 502.

The embodiment of FIG. 5 shows an empty volume 531 bordered by the inside of the housing 502, the inertial mass 512, the flexible beam 504, and the piezoelectric layers 508 and/or 510. This empty volume 531 may be configured to openly communicate with the ambient as shown in FIG. 2. In another embodiment, the empty volume 531 is hermetically sealed from the ambient. In still another embodiment, the empty volume 531 may have a lower pressure than the ambient or may have substantially zero pressure. In still another embodiment, the empty volume 531 may be filled with a desired gas.

Figure 6C:
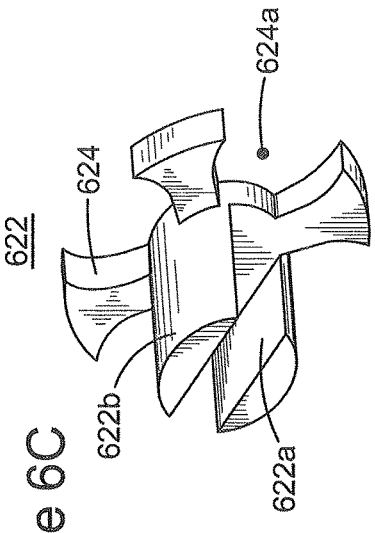
FIGS. 6A-C are schematic diagrams of another geophysical acceleration sensor according to an exemplary embodiment.
Figure 6B:
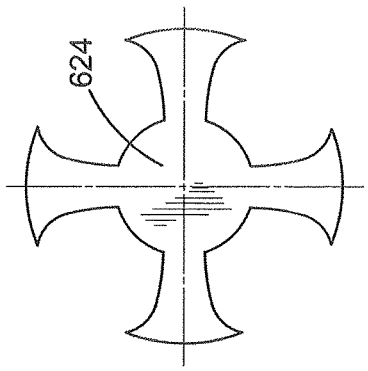
Figure 6A:
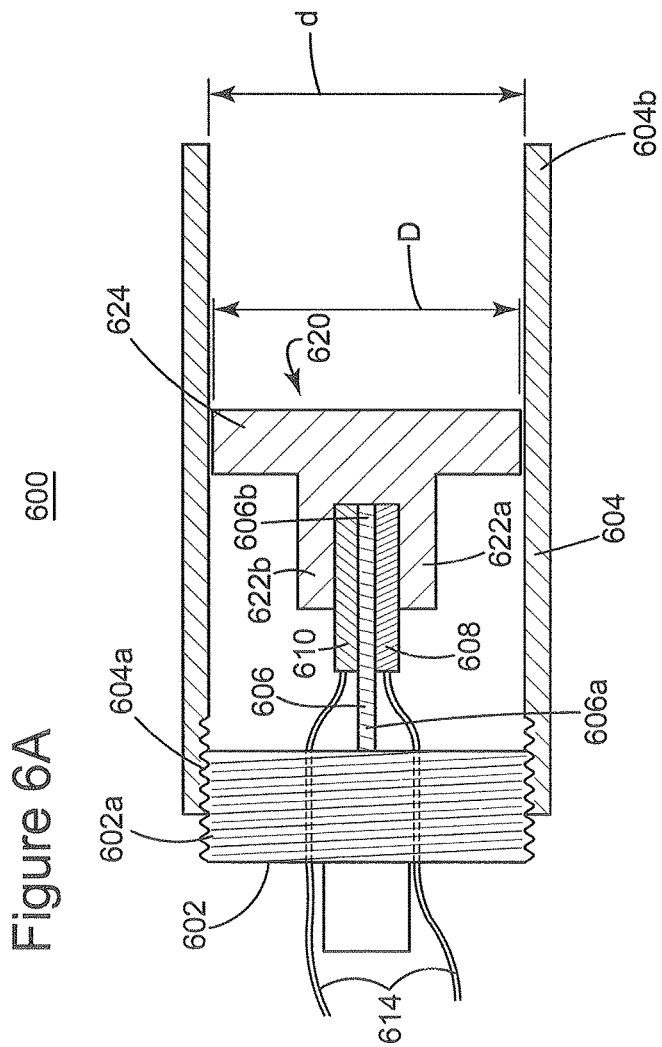

According to another exemplary embodiment illustrated in FIGS. 6A-C, a GAS 600 has a cantilevered shock-prevented structure. The GAS 600 has a base 602 that may be screwed into a protective cylinder 604. FIG. 6A shows the base 602 having threads 602a that couple to corresponding threads 604a of the protective cylinder 604. A flexible beam 606 may be attached with one end 606a to the base 602 while the other end 606b is free to oscillate. One or more piezoelectric layers 608 and 610 may be attached to the flexible beam 606 as discussed in the previous embodiments. Wires 614 connect the piezoelectric layers 608 and 610 to a control device (not shown but similar to those in the previous embodiments). An inertial mass 620 may be connected to the free end 606b of the flexible beam. Note that the inertial mass 620 has an external diameter D smaller than the internal diameter d of the protective cylinder 604. Thus, the free end 606b of the flexible beam 606 still can oscillate when the inertial mass 620 is attached.

In one application, the inertial mass 620 has one or two extended parts 622a and 622b that attach to the piezoelectric layers and/or the flexible beam 606. The extended parts may attach to the piezoelectric layers and/or the flexible beam as discussed above or using other known means. The extended parts may partially or totally cover the piezoelectric layers. The extended parts 622a and 622b are attached to a motion limiter part 624. The motion limiter part 624 may be a Maltese cross as illustrated in FIG. 6B. FIG. 6C shows an overview of the two extended parts 622a and 622b and the motion limiter part 624. FIG. 6A also shows that an end 604b of the protective cylinder 604 is open to the ambient.

Because of the shape of the motion limiter part 624, air channels (ducts) 624a are formed inside the protective cylinder 604 that may further dampen the shocks applied to the GAS 600. The ducts are there to prevent damping so the air can flow freely when the inertial mass moves.

Figure 7:
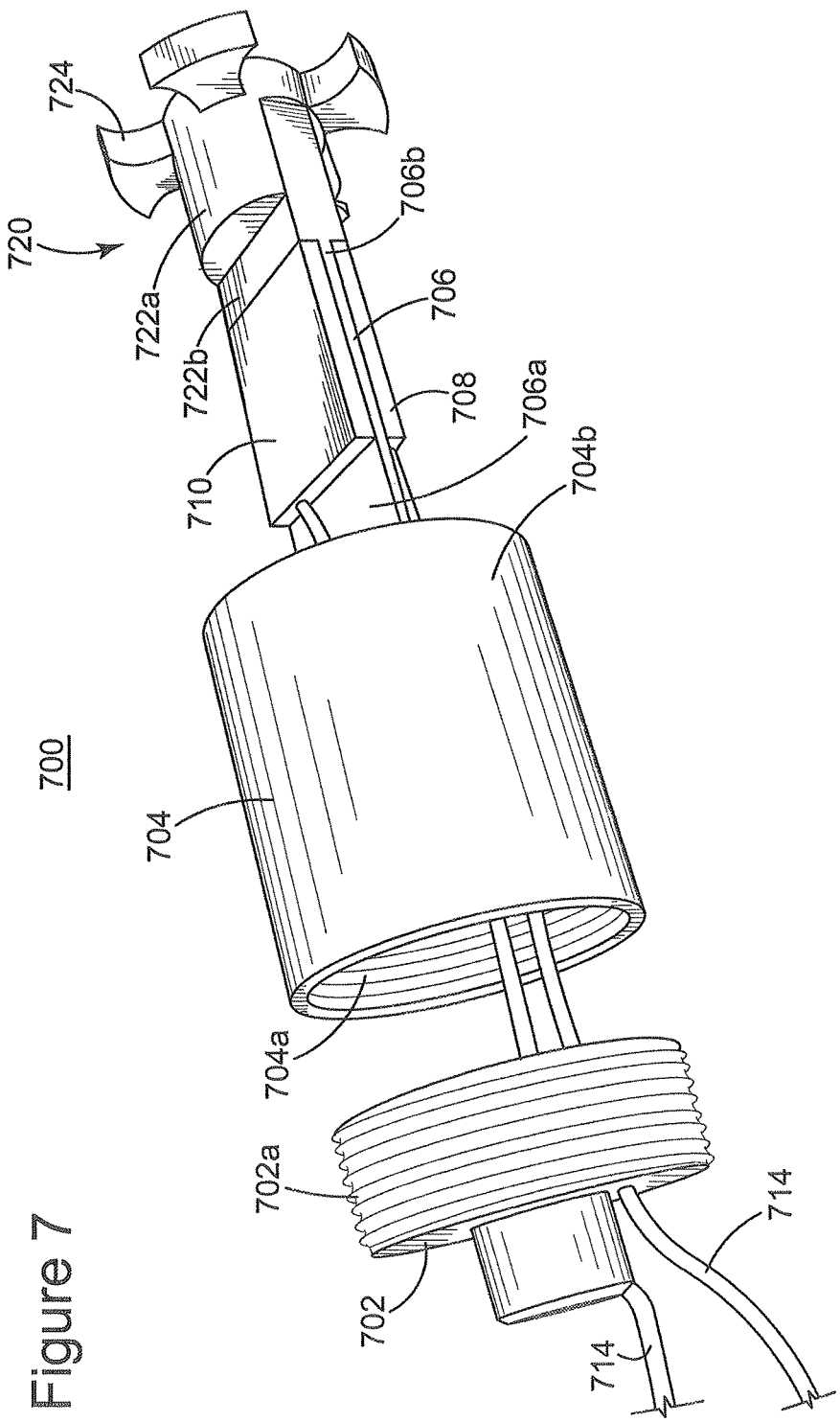
FIG. 7 is a schematic diagram of yet another geophysical acceleration sensor according to an exemplary embodiment.

According to another exemplary embodiment illustrated in FIG. 7, a GAS 700 may still have a protective cylinder 704, a base 702 that connects to the cylinder 704 through various means (e.g., threads 704a and 702a), a flexible beam 706 with one end 706a that attaches to the base 702, one or two piezoelectric layers 708 and 710 attached to the flexible beam 706, and a seismic mass 720 attached to a free end 706b of the flexible beam. However, different from the embodiment illustrated in FIGS. 6A-C, the seismic mass 720 has a round extended part 722a and a flat extended part 722b that directly connects to the flexible beam 706. In one application, the extended part 722b and the flexible beam 706 are a single piece. The extended part 722b, which is a part of the oscillating mass, may hold the piezoelectric layers 710 and 708. These piezoelectric layers can be extended to be closer to 722a and, thus, get a longer piezo-element and higher sensitivity. In one application, the flat extended part 722b is flush with the first and second piezoelectric layers 708 and 710. The round extended part 722a, the flat extend part 722b, and the flexible beam 706 can be formed as a single piece or they can be manufactured separately and then attached to each other. A movement limiter 724 may be connected to the round extended part 722a and may have the shape of a Maltese cross. Wires 714 are connected to the piezoelectric layers 708 and/or 710 and also to a control device (not shown).

Regarding the functionality of the GAS, when the GAS is subjected to acceleration, the inertial mass inertia will bend the piezoelectric material and the flexible beam and, thus, a voltage that is a function of the acceleration is produced in the electric wires. However, when the GAS suffers unexpected shocks, the movement limiters limit the free movement of the flexible beam, thus preventing damage to it.

Figure 8:
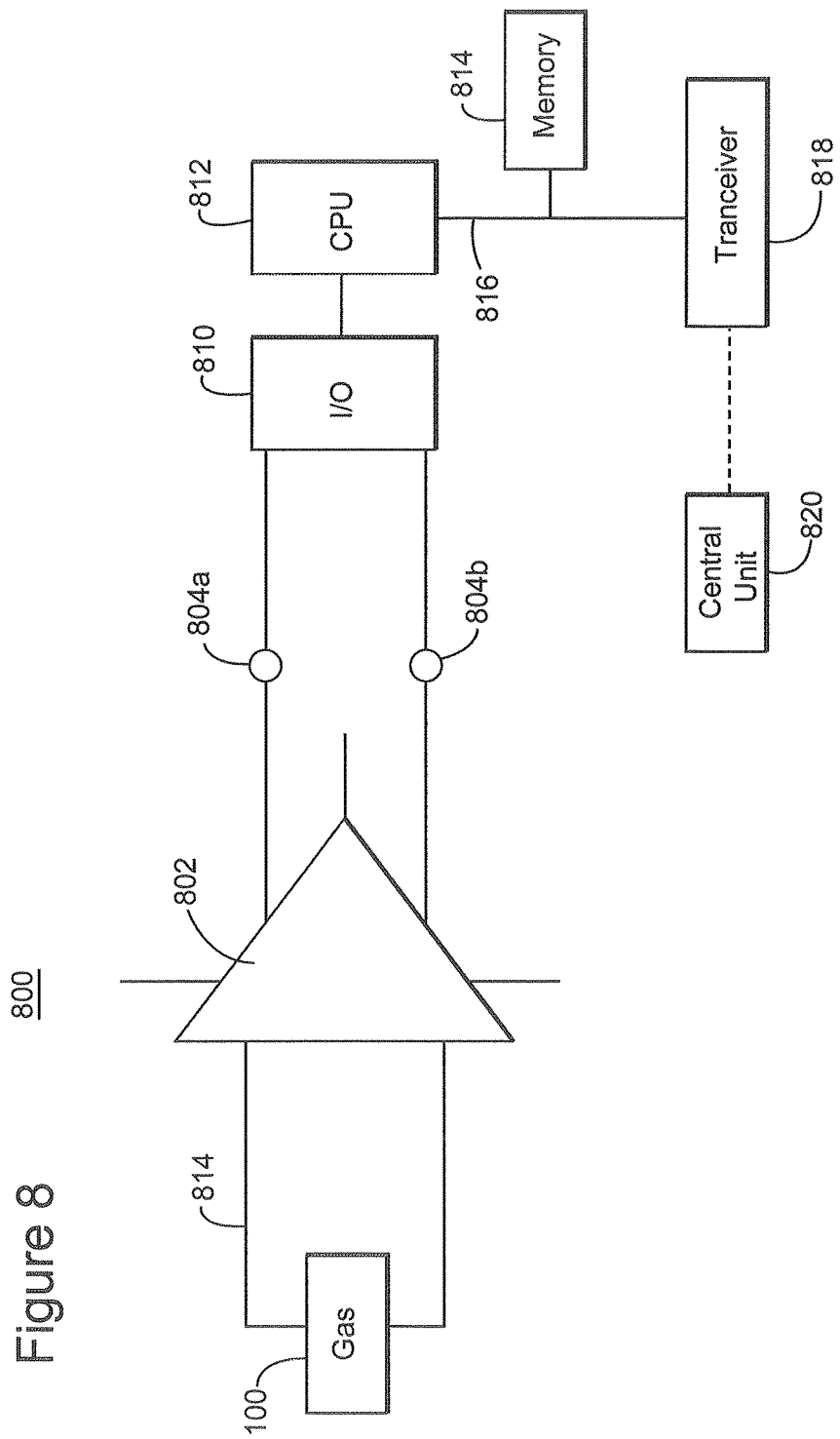
FIG. 8 is a schematic diagram of a control unit according to an exemplary embodiment.

FIG. 8 shows an exemplary control device 800 corresponding to control devices 120, 420 or 520. The control device 800 may be or may include an amplifier 802 connected by wires 814 to the GAS 100. The amplifier 802 amplifies the signal from the GAS 100 and provides the amplified signal at terminals 804a and 804b. The amplifier 802 may be any known amplifier. The control device 800 may include an interface 810 that communicates with a processor 812. Thus, the measured voltage may be transferred to the processor 812 for analysis. The processor 812 has access to a storage device 814, and these two elements are connected to each other by a bus 816. The processor may also communicate with a transceiver 818 so that measured seismic data may be sent to a central unit 820 for seismic processing. Instead or in addition to the transceiver 818, the processor may communicate over a wire (not shown) with the central unit.

Figure 9:
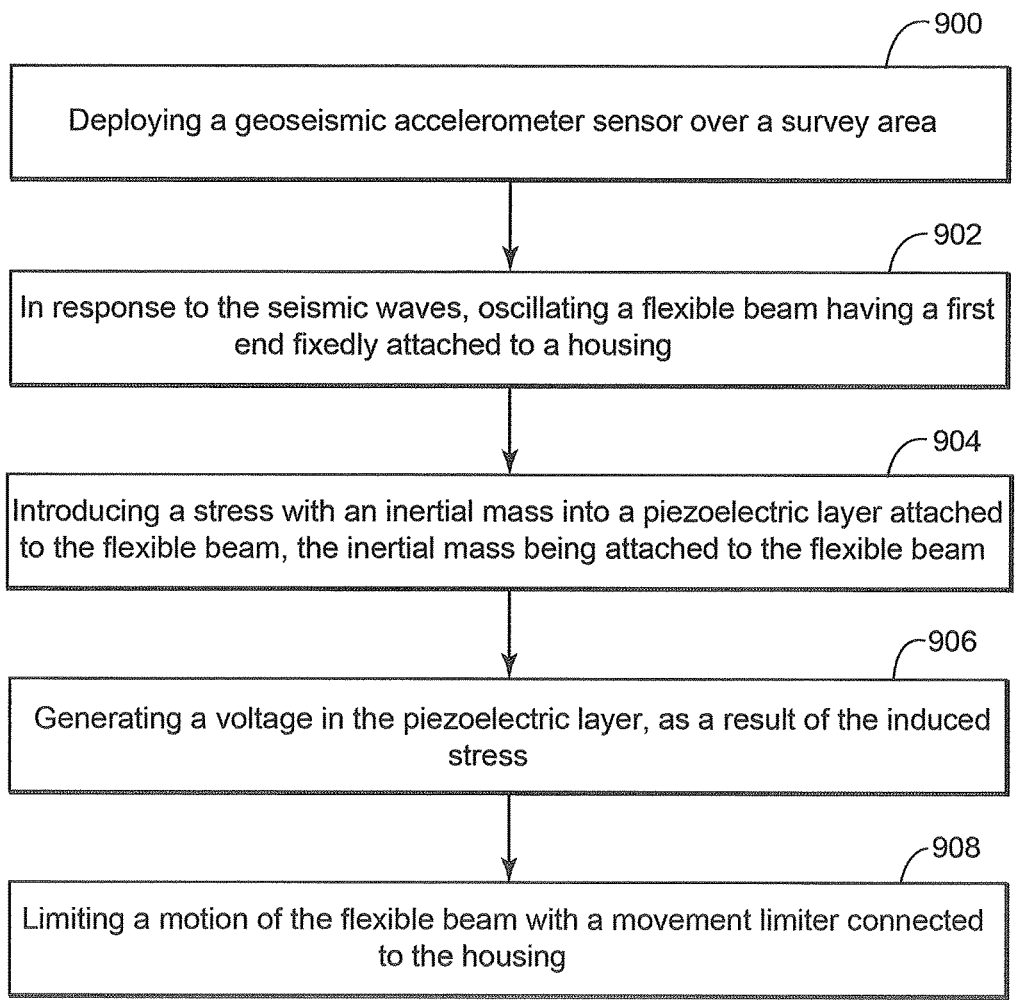
FIG. 9 is a flowchart of a method for using a geophysical acceleration sensor according to an exemplary embodiment.

In an exemplary embodiment illustrated in FIG. 9, there is a method for detecting acceleration of a medium generated by seismic waves. The method includes a step 900 of deploying a geophysical acceleration sensor over a survey area; a step 902 of oscillating, in response to the seismic waves, a flexible beam having a first end fixedly attached to a housing; a step 904 of inducing a stress with an inertial mass into a piezoelectric layer attached to the flexible beam, the inertial mass being attached to the flexible beam; a step 906 of generating a voltage in the piezoelectric layer as a result of the induced stress; and a step 908 of limiting the motion of the flexible beam with a movement limiter connected to the housing.

Figure 10:
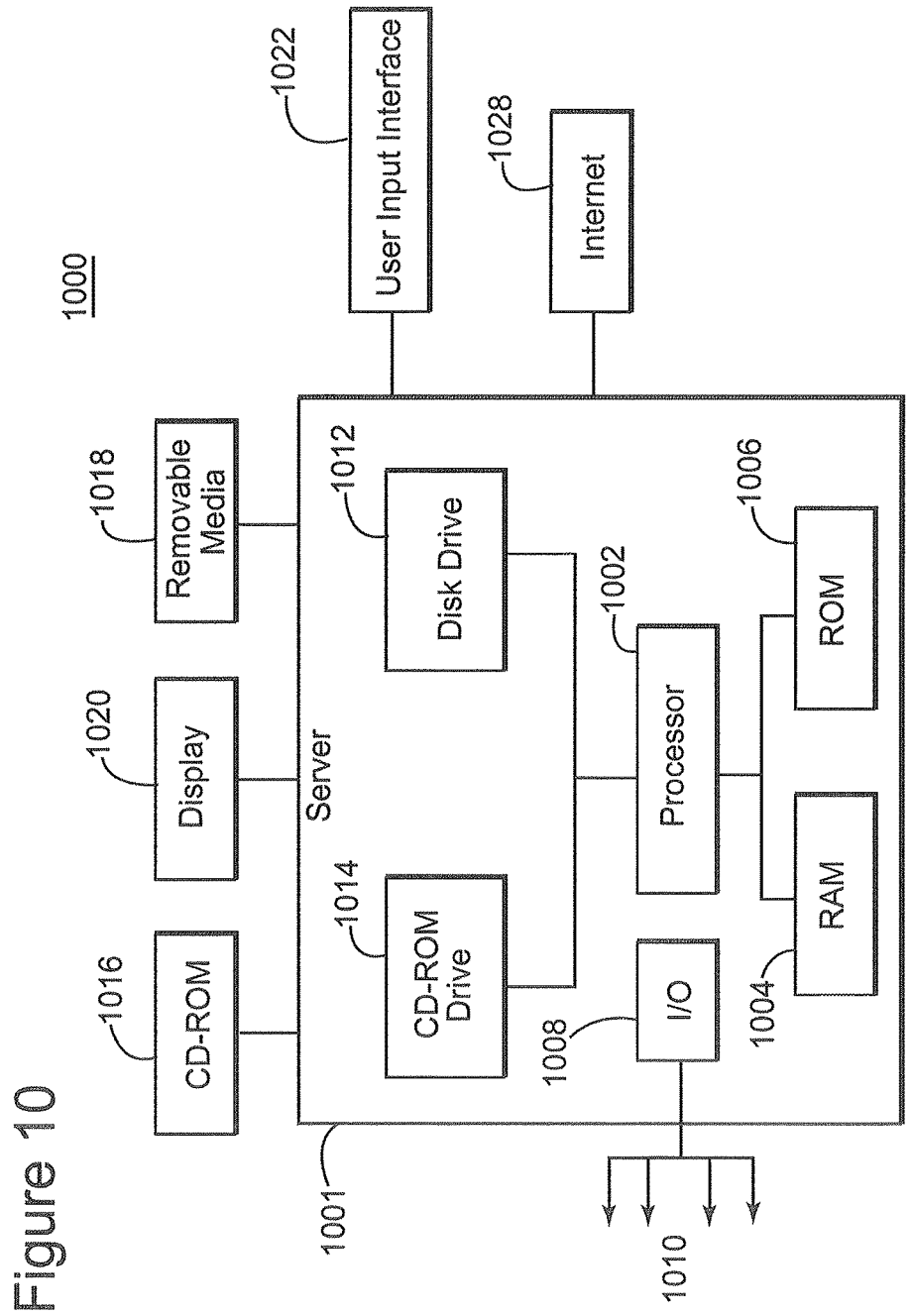
FIG. 10 is a schematic diagram of a computing device that may implement the method of FIG. 9 and/or the control unit of FIG. 8.

The above method and others may be implemented in a computing system specifically configured to receive and/or process the data from the GAS. An example of a representative computing system capable of carrying out operations in accordance with the exemplary embodiments is illustrated in FIG. 10. Hardware, firmware, software or a combination thereof may be used to perform the various steps and operations described herein. The computing system may be part of the controller 120 or may be part of the central unit 820.

The exemplary computing system 1000 suitable for performing the activities described in the exemplary embodiments may include server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010 to provide control signals and the like. The processor 1002 carries out a variety of functions as are known in the art, as dictated by software and/or firmware instructions.

The server 1001 may also include one or more data storage devices, including a hard drive 1012, CD-ROM drives 1014, and other hardware capable of reading and/or storing information such as DVD, etc. In one embodiment, software for carrying out the above-discussed steps may be stored and distributed on a CD-ROM 1016, removable memory device 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD, LED displays, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as a landline and/or wireless terminals via a network. The server may be part of a larger network configuration as in a global area network (GAN) such as the Internet 1028, which allows ultimate connection to the various landline and/or mobile client devices. The computing device may be implemented on a vehicle that performs a land seismic survey.

The disclosed exemplary embodiments provide a system and a method for mechanically deploying geophones. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A geophysical acceleration sensor for determining an acceleration of a medium during a seismic survey, the geophysical acceleration sensor comprising:
    a housing;
    a flexible beam having a first end fixedly attached to the housing;
    a piezoelectric layer attached to the flexible beam;
    a seismic mass attached to the flexible beam; and,
    a motion limiter coupled to the seismic mass and configured to limit movement of the flexible beam, wherein the motion limiter comprises a Maltese cross.

2. The sensor of claim 1, wherein the housing includes two housing parts that fixedly sandwich both ends of the flexible beam.

3. The sensor of claim 2, wherein the two housing parts are connected to each other with screws.

4. The sensor of claim 1, further comprising:
    a second piezoelectric layer attached to the flexible beam, opposite to the first piezoelectric layer.

5. The sensor of claim 4, further comprising:
    electric wires, one connected to the first piezoelectric layer and another one connected to the second piezoelectric layer.

6. The sensor of claim 1, wherein the flexible beam has at least one portion free to oscillate.

7. The sensor of claim 1, wherein the seismic mass is coupled to the flexible beam between the first end and the second end.

8. The sensor of claim 7, wherein the seismic mass is coupled to the flexible beam near a middle portion of the flexible beam.

9. The sensor of claim 1, wherein the first and second ends of the flexible beam do not move.

10. The sensor of claim 1, wherein the second end is attached to the housing opposite to the first end.

11. A geophysical accelerator sensor for determining an acceleration of a medium during a seismic survey, the geophysical accelerator sensor comprising:
    a housing having at least one openings;
    a base that attaches to the at least one opening of the housing;
    a flexible beam having a first end fixedly attached to the base;
    a piezoelectric layer attached to the flexible beam; and
    a seismic mass attached to a second end of the flexible beam,
    a motion limiter part coupled to the seismic mass and configured to limit movement of the flexible beam, wherein the seismic mass comprises air ducts for allowing air to move freely during movement of the seismic mass.

12. The sensor of claim 11, wherein the seismic mass comprises:
    a flat extended part that attaches to the piezoelectric layer;
    a round extended part that attaches to the flat extended part; and
    wherein the motion limiter part connects to the round extended part.

13. The sensor of claim 12, wherein the motion limiter part is a Maltese cross.

14. The sensor of claim 11, wherein the housing has a cylindrical shape, and an internal diameter d of the housing is larger than an outer diameter D of the motion limiter part so that the second end of the flexible beam can oscillate within a predefined range.

15. The sensor of claim 11, wherein the base screws into the housing.

16. The sensor of claim 11, further comprising:
    a second piezoelectric layer attached to the flexible beam, opposite to the first piezoelectric layer.

17. The sensor of claim 16, further comprising:
    electric wires, one connected to the first piezoelectric layer and another one connected to the second piezoelectric layer.

18. The sensor of claim 11, wherein the seismic mass has a portion in the shape of a cross.

19. The sensor of claim 11, wherein the seismic mass has a plurality of portions in the shape of a cross.

20. The sensor of claim 11, wherein the seismic mass has a plurality of extending parts.

21. The sensor of claim 11, wherein the one or more motion limiters comprises a cross.

22. The sensor of claim 11, wherein a portion of the seismic mass has a cross-sectional area in the form of a Maltese cross.

23. A method for detecting an acceleration of a medium generated by seismic waves, the method comprising:
    deploying a geophysical acceleration sensor over a survey area;

in response to the seismic waves, oscillating a flexible beam having a first end fixedly attached to a housing;
inducing a stress with an inertial mass into a piezoelectric layer attached to the flexible beam, the inertial mass being attached to the flexible beam;
limiting a motion of the flexible beam with a movement limiter that comprises a Maltese cross; and
generating a voltage in the piezoelectric layer, as a result of the induced stress.

\* \* \* \* \*